No. 835,355. PATENTED NOV. 6, 1906.
J. N. FROEBER.
VEHICLE SEAT.
APPLICATION FILED NOV. 24, 1905.

2 SHEETS—SHEET 1.

Witnesses:
Julius Lankes
Harry Harris

John N. Froeber, Inventor.
By Emil Neuhart
Attorney.

No. 835,355. PATENTED NOV. 6, 1906.
J. N. FROEBER.
VEHICLE SEAT.
APPLICATION FILED NOV. 24, 1905.
2 SHEETS—SHEET 2.
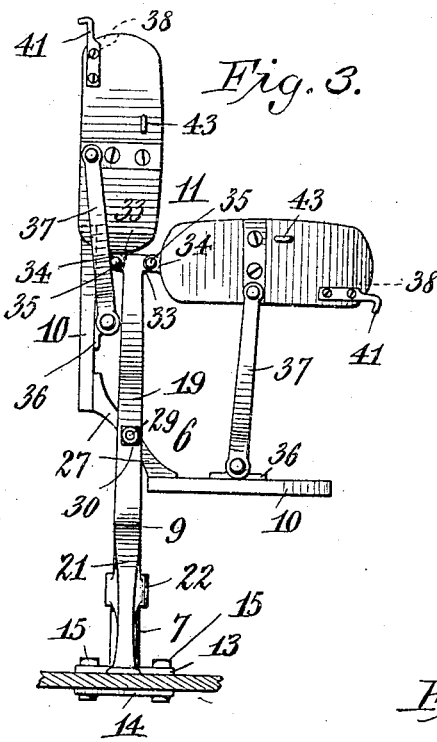
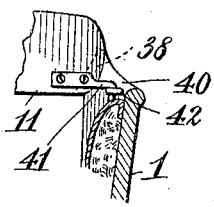
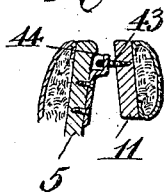
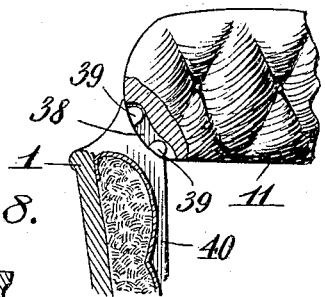
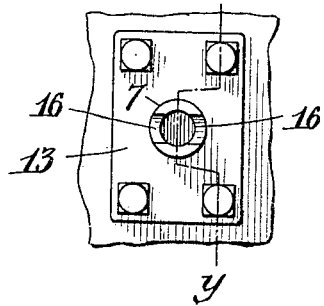
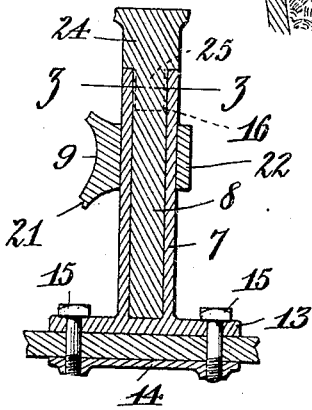
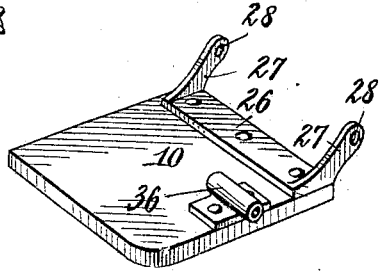
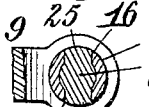
Witnesses:
Julius Lankes
Harry Harris
John N. Froeber, Inventor.
By Emil Neuhart
Attorney.

UNITED STATES PATENT OFFICE.

JOHN N. FROEBER, OF BUFFALO, NEW YORK.

VEHICLE-SEAT.

No. 835,355.  Specification of Letters Patent.  Patented Nov. 6, 1906.

Application filed November 24, 1905. Serial No. 288,885.

*To all whom it may concern:*

Be it known that I, JOHN N. FROEBER, a citizen of the United States, residing at Buffalo, in the county of Erie and State of New York, have invented certain new and useful Improvements in Vehicle-Seats, of which the following is a specification.

This invention relates to an auxiliary seat for vehicles, and more particularly to a seat for use in automobiles; and its primary object is the construction of a seat which is reliable, comfortable, easily applied and rigid when applied, and which may be used either facing forward or facing rearward.

Other objects are to provide a seat which has two hinged sections, either of which may be elevated to render the rear seat easily accessible, to provide simple and effective means for rigidly connecting the back-rests to the sides of the vehicle-body, to provide a substantial support in which the seat is removably held, and to otherwise improve on auxiliary seats for vehicles now in use.

With these and other objects in view my invention consists in the novel construction, arrangement, and combination of parts to be hereinafter described, and particularly pointed out in the appended claims.

Figure 1:
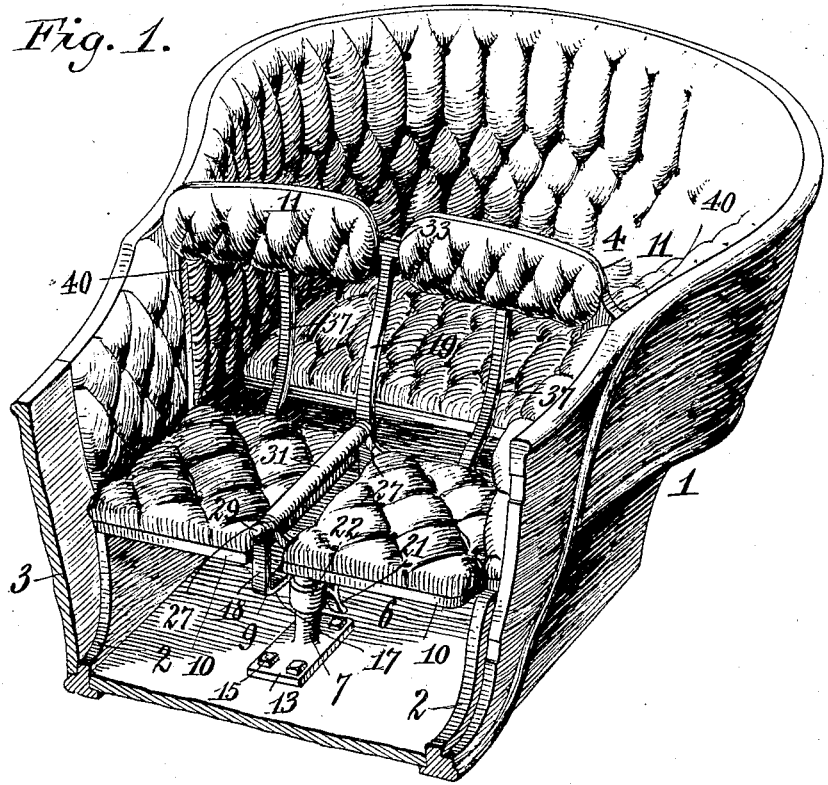
Figure 2:
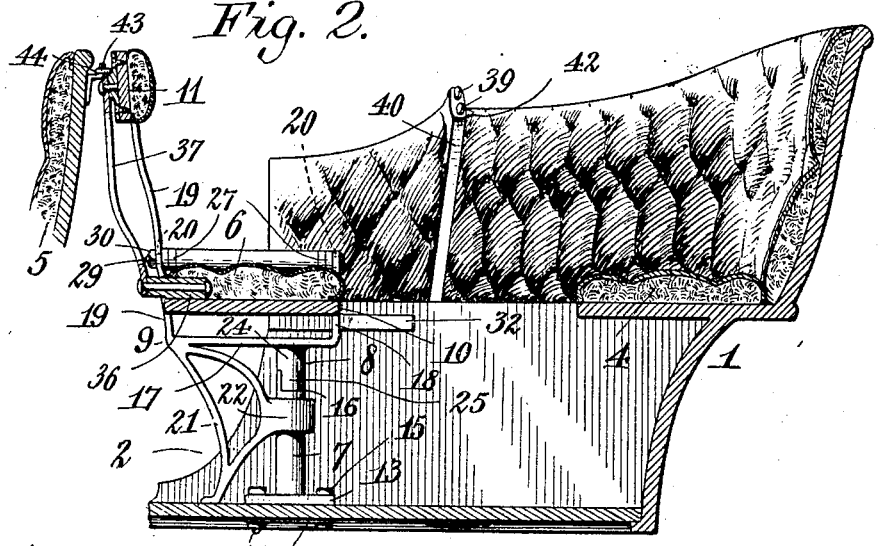

Referring to the drawings, Figure 1 is a sectional perspective view of the rear end of a vehicle-body, such as are used in motor-vehicles, showing my improved auxiliary seat in use and arranged to face forward. Fig. 2 is a longitudinal section through the same with the auxiliary seat reversed. Fig. 3 is a rear view of the seat, one of the hinged sections thereof being swung upward. Fig. 4 is a sectional elevation showing the side of the vehicle-body in section and one end of the back-rest hooked thereto. Fig. 5 is a section through the back-rest of the rigid front seat and the back-rest of the auxiliary seat when reversed, showing the manner of connecting the two. Fig. 6 is a sectional elevation showing the dowels on one side of the vehicle-body fitting into a groove in the adjacent end of the back-rest of the auxiliary seat. Fig. 7 is a plan view of the support for the auxiliary seat. Fig. 8 is a vertical section of the seat-post and the seat-support, taken on a plane indicated by line $y\,y$, Fig. 7. Fig. 9 is a cross-section taken on line $z\,z$, Fig. 8. Fig. 10 is a detached perspective view of one of the seat-board sections having the brackets for the pivot-bolt and back seat-brace secured thereto.

Referring to the drawings in detail, like numerals of reference refer to like parts in the several figures.

The reference-numeral 1 designates the body of a vehicle, 2 the side openings or entrances therein, 3 the door for one of said openings, the other door being omitted to better illustrate the invention, and 4 and 5 the rear and front rigid seats, respectively. These parts may be varied in design or shape, as they form no part of my invention.

In the space between the front and rear seats my improved auxiliary seat 6 is located. In the preferred embodiment of my invention I provide a suitable hollow support 7 for the reception of the seat-post 8, which carries the seat-frame 9. Said frame has pivotally connected thereto the two hinged seat-boards 10, to which latter and said frame the sectional back-rest 11 is pivotally secured.

The seat-support comprises a hollow post, preferably cylindrical and having at its lower end a base-plate 13, through which, the bottom of the vehicle-body, and a metallic plate 14, held against the under side of said bottom, bolts 15 are passed, by means of which said support is rigidly secured. The upper end of the support is notched at diametral points, as at 16, for a purpose to appear presently.

The seat-frame 9 comprises a transverse bar 17, having integral upturned arms 18 19 at its ends, provided with coinciding apertures 20 and a brace 21, projecting downward from the rear end of said bar and provided with a collar 22, fitting over the seat-support, said brace being adapted to bear against the bottom of the vehicle-body. Suitably secured to the under side of the bar 17 is the seat-post 28, having an enlarged upper end 24 with depending ears 25, which enter the notches 16 in the seat-support, preventing thereby the turning of the seat after being properly placed.

The seat-boards are separated by a slight space, and each is provided at its inner end with a bracket 26, having inwardly and upwardly directed bracket-arms 27. Said bracket-arms have coinciding apertures 28 at their outer ends which register with the apertures in the upturned arms 18 19 of the seat-frame. A pivot-bolt 29 is passed through the apertures in the bracket-arms and the upturned arms of the seat-frame, and applied to the rear threaded end thereof is a nut 30, adapted to securely and pivotally lock the seat-boards to said frame. A sleeve 31 surrounds said pivot-bolt to provide a neat finish. It is apparent, therefore, that both seat-boards may be swung upward on said pivot-bolt. The outer ends of said seat-boards are adapted to rest on cleats or ledges 32 on the side walls of the vehicle-body, and by reason of the outer ends being unattached either section may be swung upward, thus rendering the rear fixed seat easily accessible from either side of the vehicle.

The rear upturned arm 19 of the seat-frame is longer than the front upturned arm, and at its upper end it is provided with apertured ears 33, to which the inner ends of the back-rests are secured, each back-rest having an apertured ear 34 at its inner end, through which and the ears 33 on the seat-frame pivot pins or bolts 35 are passed. A bracket 36 is secured to each seat-board, and pivotally connected therewith is a support or brace 37, having its opposite end pivotally connected to the back-rest. By means of this arrangement the back-rests are given a good support and may be swung upward with the seat-boards, as shown in Fig. 3. I have, however, provided additional means for holding back-rests rigid, and for this purpose have grooved the outer ends thereof, as at 38, into which grooves tenons or ears 39 fit that extend from vertical supports or ledges 40, secured to the sides of the vehicle-body. A rigidly-affixed hook 41 is also provided at each end of the back-rest, which is adapted to engage an eye 42 on the adjacent support 40.

The foregoing description refers to the use of the seat when facing forward; but when reversed there are no connections between the supports 40 and the back-rests. When reversing the seat, it is simply necessary to elevate the same sufficiently to disengage the ears on the seat-post from the notches in the seat-support and then rotate the seat to the necessary extent, whereupon it may again be lowered to cause the said ears to enter the opposite notches. When the seat is reversed, connection is made to the front seat by means of eyes 43 on the back-rests of the auxiliary seat, in which fit hooks 44, secured to the back-rest of said front seat. In this manner the seat is rigidly held and the connection between the two seats easily made while lowering the seat after being revolved.

The seat-boards and back-rests may be upholstered and a very comfortable seat provided, which may be removed from the vehicle or applied in forward or reverse position, as may be desired.

My invention is susceptible to changes in form, arrangement, and minor details of construction without departing from the principle involved or sacrificing any of the advantages thereof.

Having thus described my invention, what I claim is—

1. An auxiliary seat for vehicles, comprising a suitable frame and two sections pivotally connected at their inner ends, both sections being free to swing upward.

2. An auxiliary seat for vehicles, comprising a suitable frame, two seat-boards pivotally connected at their inner ends to said frame, supports pivotally connected at their lower ends to said seat-boards, and back-rests to which the upper ends of said supports are pivotally secured.

3. An auxiliary seat comprising a suitable frame having an upstanding arm, two seat-boards pivotally connected at their inner ends to said frame, supports pivotally connected at their lower ends to said seat-boards, and back-rests to which the upper ends of said supports are pivotally secured, said back-rests having their inner ends pivotally attached to the upper end of said upstanding arm.

4. An auxiliary seat comprising a support, a frame held to said support and having upstanding arms provided with coinciding apertures, a pivot-bolt passed through said arms, seat-boards having brackets at their inner ends pivotally attached to said pivot-bolt to permit the seat-boards to be swung upward, and suitable back-rests adapted to be swung upward with the seat-boards.

5. An auxiliary seat comprising a hollow support having its upper end notched at diametral points, a seat-frame having a seat-post entering said support, said seat-post having depending ears fitting into said notches, and a suitable seat-board carried on the frame.

6. An auxiliary seat comprising a hollow support, a seat-frame having a seat-post fitting into said support, means to prevent turning of the seat-post within said support, and a suitable seat-board carried on the frame.

7. An auxiliary seat comprising a hollow support, a seat-frame having a downwardly-extending brace and a collar on said brace fitting around the support and having also a post fitting into said support, and a suitable seat-board carried on said frame.

8. An auxiliary seat comprising a hollow cylindrical support having notches at its upper end, a seat-post entering said support and having ears adapted to enter said notches, and a seat-board receiving support from said seat-post.

9. An auxiliary seat comprising a support, a seat-frame carried by said support and having a long and short upstanding arm provided with coinciding apertures, said long upstanding arm having lateral ears at its upper end, a pivot-bolt passed through the coinciding apertures in said arm, two seat-boards having each a bracket at its inner ends for pivotal connection with said pivot-bolt, back-rests having their inner ends pivotally attached to the lateral ears of said long upstanding arm, and supports having opposite ends connected to the seat-boards and the back-rests, respectively.

10. The combination with a vehicle-body having ledges on opposite side walls, of an auxiliary seat comprising a support and two seat-boards having their inner ends pivotally connected to the support and their outer ends resting on said ledges.

11. The combination with a vehicle-body, of a support arranged centrally in said body, and a sectional seat hinged centrally to permit both sections to be swung upward and inward, and means to support the ends of said seat-sections.

12. The combination with a vehicle-body, having inwardly-projecting dowels or ears, of an auxiliary seat having a back-rest provided with grooves at the outer ends into which said dowels or ears are adapted to enter.

13. The combination with the vehicle-body, of a hollow support secured to said body, and a seat having a seat-post capable of being rotated in said support, to permit the seat to be reversed when desired.

14. The combination with a vehicle-body having an eye projecting from each side wall, of an auxiliary seat supported on the bottom of said body and having a back-rest, and hooks projecting from the outer ends of said back-rest and adapted to engage said eyes.

15. The combination with a vehicle-body having a rigid front seat and a rigid rear seat, of an auxiliary seat arranged between said rigid seats and designed for use in a reversed manner, said auxiliary seat having a back-rest, a hook on the back-rest of the rigid front seat, and an eye in the back-rest of the auxiliary seat adapted to engage said hook.

In testimony whereof I have affixed my signature in the presence of two subscribing witnesses.

JOHN N. FROEBER.

Witnesses:
 EMIL NEUHART,
 MAY F. SEWERT.